(12) United States Patent
van Beurden

(10) Patent No.: US 10,871,388 B2
(45) Date of Patent: Dec. 22, 2020

(54) SYSTEM AND DEVICE FOR MEASURING FLUID FLOW WITHIN A CONDUIT

(71) Applicant: Pason Systems Corp., Calgary (CA)

(72) Inventor: Marceau van Beurden, Calgary (CA)

(73) Assignee: PASON SYSTEMS CORP.

( * ) Notice: Subject to any disclaimer, the term of this patent is extended or adjusted under 35 U.S.C. 154(b) by 342 days.

(21) Appl. No.: 15/917,433

(22) Filed: Mar. 9, 2018

(65) Prior Publication Data
US 2019/0277672 A1    Sep. 12, 2019

(51) Int. Cl.
| | |
|---|---|
| *G01F 1/075* | (2006.01) |
| *G01D 5/14* | (2006.01) |
| *G01D 11/24* | (2006.01) |
| *E21B 21/08* | (2006.01) |
| *E21B 33/06* | (2006.01) |

(52) U.S. Cl.
CPC .......... *G01F 1/0755* (2013.01); *E21B 21/08* (2013.01); *G01D 5/145* (2013.01); *G01D 11/245* (2013.01); *E21B 33/06* (2013.01)

(58) Field of Classification Search
CPC .......... G01F 1/0755; G01F 1/20; G01F 1/28; G01D 5/145; G01D 11/245; E21B 21/08; E21B 33/06; E21B 21/01
See application file for complete search history.

(56) References Cited

U.S. PATENT DOCUMENTS

| | | | | |
|---|---|---|---|---|
| 4,090,523 | A * | 5/1978 | Kelly, Jr. | E21B 21/065 134/18 |
| 2007/0044574 | A1* | 3/2007 | Kawamoto | E03B 7/09 73/861.74 |
| 2010/0059937 | A1* | 3/2010 | Castleman | F16J 15/3236 277/309 |
| 2010/0182762 | A1* | 7/2010 | Itomi | G01D 5/24452 361/807 |
| 2016/0356805 | A1* | 12/2016 | Schneider | G01P 13/02 |

OTHER PUBLICATIONS

"New-Flow-Paddle", retrieved from <<http://rigminder.com/2015/wp-content/uploads/2015/05/New-Flow-Paddle.png>> on Jan. 12, 2017.

(Continued)

*Primary Examiner* — Randy W Gibson
*Assistant Examiner* — John M Royston
(74) *Attorney, Agent, or Firm* — Katten Muchin Rosenman LLP

(57) ABSTRACT

There is described a system for measuring fluid flow within a conduit. The system comprises a conduit for conveying a fluid, a mount attached to the conduit which may define a high-pressure zone in an interior of the conduit and a low-pressure zone in an exterior of the conduit, and a flow sensing device attached to the mount and configured to move relative to the mount in response to flow of the fluid within the conduit. The flow sensing device is attached to the mount via a coupling which may be located within the high-pressure zone. The system further includes a sensor configured to measure movement of the flow sensing device. The flow sensing device may comprise a paddle and a straight arm extending from the paddle to the coupling.

24 Claims, 4 Drawing Sheets

(56) References Cited

OTHER PUBLICATIONS

"Flow Level Encoder", retrieved from <<http://4runnertech.com/yahoo_ site_ admin/assets/images/FLE_1000jpeg.83162629 _ std.jpg>> on Jan. 12, 2017.
"Flow-Paddle", retrieved from <<http://www.efcgroup.neVimages/flow-paddle.jpg>> on Jan. 12, 2017.
"9465463-SerieDLS-011", retrieved from <<http://www.hohner-elektrotechnik.de/upload/9465463-SerieDLS-OO 1. png>> on Jan. 12, 2017.
"97TA0006 Mud Flow Sensor", retrieved from <<http:/lmatherneis.com/wp17/wp-contenl/uploads/2017/11197TA0006-Mud-Flow-Sensor-web-300x21 O.jpg>> on Jan. 12, 2017.
"Mud Flow Out", retrieved from <<http://mudloggingsupplies.com/datalmudlogging%20sensor2/Mud%20Flow%200ut.jpg>> on Jan. 12, 2017.
"RFMjpeg.87163737", retrieved from <<http://4runnertech.com/yahoo_ site _admin/assets/images/RFMjpeg.87163737 _ std.jpg>> on Jan. 12, 2017.
"3016.jpg", retrieved from <<http://www.geology-mudlogging.com/wp--conlenUuploads/2013/09/3016.jpg>> on Jan. 12, 2017.
"Cameron—Mud Flow Sensor", Retrieved from <<https://imgv2-2-f.4.scribdassets.com/img/document/339884532/original/ce9f24647e/1508801117>> on Jan. 12, 2017.
"MFT-pic", retrieved from <<https:I/advancedsensordesign.comlwp-content/uploads/2014/04/MFT-pic.png>> on Jan. 12, 2017.
"Petron Pason Mud Monitoring Systems", retrieved from <<http://www.rigmanufacturing.com/wp-content/uploads/2012/10/Petron-Pason-Mud-Monitoring-System-9.jpg>> on Jan. 12, 2017.

* cited by examiner

SYSTEM AND DEVICE FOR MEASURING FLUID FLOW WITHIN A CONDUIT

FIELD OF THE DISCLOSURE

The present disclosure relates to a system, a device, and a method for measuring fluid flow within a conduit.

BACKGROUND TO THE DISCLOSURE

In the oil and gas industry, flow meters are typically used to measure the rate of flow of a drilling fluid, such as drilling mud, to a mud tank. The readings provided by the flow meter are used in various contexts. For example, during a drilling operation it is important to determine the net flow of drilling mud, that is the amount of mud pumped into the wellbore compared to the amount of mud coming out of the wellbore. If the rate of mud flow out of the wellbore is too high, this could indicate that gas has entered the wellbore and is displacing mud (known as a kick). Conversely, if the rate of mud flow out of the wellbore is too low, this could indicate that drilling mud is being lost to the formation. If hydrostatic pressure is less than formation pressure, gas will enter the wellbore and a kick could result. Alarms are therefore typically employed to alert the drilling operator should the system determine the flow rate of mud out of the wellbore to have exceeded one or more predefined thresholds. Inaccurate readings of mud flow rate therefore directly impact the system's ability to anticipate downhole problems, as well as trigger the appropriate alarm. As a result, accurate flow meters are important to the safety of the drilling operation.

Typical flow meters are not without their drawbacks, however. For instance, it has been found that the sensitivity of a typical flow meter decreases through extended use. This may be caused, for instance, by drilling fluid interfering with seals provided on the flow meter. Such interference may increase the resistance to motion of the flow meter's paddle, rendering sensor readings less accurate. Another problem encountered with conventional flow paddles is that they may exhibit a sensitivity which is highly dependent on the viscosity of the drilling fluid.

There is therefore a need in the art to provide improved flow meters that may be used to more accurately and more reliably measure fluid flow within a conduit.

SUMMARY OF THE DISCLOSURE

In a first aspect of the disclosure, there is provided a system for measuring fluid flow within a conduit. The system comprises: a conduit for conveying a fluid; a mount attached to the conduit and defining a high-pressure zone in an interior of the conduit and a low-pressure zone in an exterior of the conduit; a flow sensing device attached to the mount and configured to move relative to the mount in response to flow of the fluid within the conduit, wherein the flow sensing device is attached to the mount via a coupling located within the high-pressure zone; and a sensor configured to measure movement of the flow sensing device.

The system may further comprise one or more static seals for preventing fluid communication between the high-pressure zone and the low-pressure zone. The one or more static seals may comprise one or more of: an O-ring, a gasket, and a plug (for example a National Pipe Thread plug). By locating the coupling within the high-pressure zone, there is a reduced need to employ dynamic seals as is typically done in the prior art. In the prior art, dynamic seals must be configured to perform both a sealing function and additionally permit some movement of the coupling's surfaces against which the dynamic seal is in contact. Invariably, some fluid may leak past the seal as a result, and may reduce the effectiveness of the flow paddle. Furthermore, the dynamic seals may grip the coupling with increasing pressure as pressure increases within the conduit, increasing resistance to motion. On the other hand, with the static seals described herein, as well as by locating the coupling within the high-pressure zone, there is little or no pressure differential to increase seal drag or to force fluid into the bearings.

The sensor may be a magnetic sensor.

The flow sensing device may be configured to operate in a high-pressure zone of up to 100 psi. This may be due (but is not necessarily due) in part to the use of an incompressible backing fluid (described below) and the use of one or more static seals.

The flow sensing device may comprise a paddle and a straight arm extending from the paddle to the coupling. A straight line may connect an end of the paddle, the straight arm and the coupling, and in particular the pivot point between the straight arm and the mount. By providing a straight arm extending from the paddle to the coupling, the sensitivity to flow of the flow sensing device may be increased. As a result, drag on the paddle surface which is heavily related to viscosity may have minimal impact on the angle of the paddle due to the line of action of the force passing through the pivot of the flow sensing device, and hence may create little or no rotational torque as it would in bent arm designs. In prior art flow paddles, additional lift from drag caused by the viscosity of the fluid typically accounts for flow rate measurement errors. Negating viscosity effects allows the paddle to be sensitive only to the desired measurement of fluid height, which results in a higher accuracy measurement of true flow. Thus, with a straight arm design the flow sensing device may be less sensitive to changes in viscosity of the fluid, and accordingly may more accurately reflect changes in flow rate.

The coupling may comprise a shaft attached to the flow sensing device and configured to rotate relative the mount. The mount may comprise a bearing arrangement for facilitating rotation of the shaft relative to the mount. The shaft may be fixed to an end of the straight arm.

At least a portion of the shaft may be located within the high-pressure zone. The sensor may be located within the conduit. The bearing arrangement may comprise an incompressible fluid, such as incompressible grease. The incompressible fluid may be in contact with the shaft for facilitating rotation of the shaft relative to the mount. The bearing arrangement may further comprise a pressure-balanced seal, such as a wiper, for preventing contact between the incompressible fluid and a fluid flowing through the conduit. For the purposes of this disclosure, an incompressible fluid is one which undergoes negligible compression in response to a pressure of up to about 100 psi.

By locating the coupling within the high-pressure zone, the need to use dynamic seals is reduced. The pressure-balanced seal may be used to separate, for example, process mud from the incompressible fluid (e.g. grease), thereby resulting in little or no friction in the pivot. The backing fluid may then be sealed from atmospheric pressure using static seals at a location where the pressure differential does not negatively affect sensor movement.

The sensor may be sealed from the high-pressure zone in an enclosure and by using one or more static seals. The sensor may comprise a Hall effect sensor array located within the enclosure and configured to detect a change in a magnetic field generated by a magnetic component fixed to the coupling. The enclosure and seals may shield the Hall effect sensor array and any associated circuitry from explosive gases and mud flowing through the conduit. This is in contrast to prior art designs which house the sensing electronics outside of the conduit to protect them from the hazardous environment within the conduit. On the other hand, by positioning the coupling and associated sensing circuitry within the conduit itself, embodiments of the system described herein may permit the use of a straight arm from the paddle to the coupling to improve the accuracy of measurements. In order to address the potentially greater risk of damage to the sensing equipment, the Hall effect sensor array and any associated circuitry may therefore be sealed within the above-described enclosure.

In a further aspect of the disclosure, there is provided a flow sensing device for measuring fluid flow within a conduit. The flow sensing device comprises a paddle; a mount configured to be attached to a conduit for conveying a fluid; a straight arm attached to the mount and extending from the paddle to the mount, wherein the straight arm is configured to move relative to the mount in response to flow of the fluid within the conduit; and a sensor configured to measure movement of the flow sensing device.

The flow sensing device may further comprise one or more static seals adjacent one or more apertures formed in the mount.

The straight arm may be attached to the mount via a coupling comprising a shaft attached to the straight arm and configured to rotate relative the mount. A straight line may connect an end of the paddle, the straight arm and the coupling.

The mount may comprise a bearing arrangement for facilitating rotation of the shaft relative to the mount. The bearing arrangement may comprise an incompressible fluid, such as incompressible grease. The incompressible fluid may be in contact with the shaft for facilitating rotation of the shaft relative to the mount. The bearing arrangement may further comprise a pressure-balanced seal, such as a wiper, for preventing contact between the incompressible fluid and a fluid flowing through the conduit.

The sensor may be sealed in an enclosure with one or more static seals adjacent one or more apertures formed in the enclosure. The sensor may comprise a Hall effect sensor array located within the enclosure and configured to detect a change in a magnetic field generated by a magnetic component fixed to the coupling.

In a further aspect of the disclosure, there is provided an apparatus for measuring fluid flow within a conduit. The apparatus comprises a mount configured to be attached to a conduit for conveying a fluid; a flow sensing device attached to the mount and configured to move relative to the mount in response to flow of the fluid within the conduit; one or more static seals adjacent one or more apertures formed in the mount, for preventing fluid communication from a first side of the mount to a second side of the mount via the one or more apertures; and a sensor configured to measure movement of the flow sensing device.

The flow sensing device may comprise a paddle and a straight arm extending from the paddle to the mount. The straight arm may be attached to the mount via a coupling comprising a shaft attached to the straight arm and configured to rotate relative the mount. A straight line may connect an end of the flow sensing device, the straight arm and the coupling.

The mount may comprise a bearing arrangement for facilitating rotation of the shaft relative to the mount. The bearing arrangement may comprise an incompressible fluid, such as incompressible grease. The incompressible fluid may be in contact with the shaft for facilitating rotation of the shaft relative to the mount. The bearing arrangement may further comprise a pressure-balanced seal, such as a wiper, for preventing contact between the incompressible fluid and a fluid flowing through the conduit.

The sensor may be sealed in an enclosure with one or more further static seals adjacent one or more apertures formed in the enclosure. The sensor may comprise a Hall effect sensor array located within the enclosure and configured to detect a change in a magnetic field generated by a magnetic component fixed to the coupling.

In a further aspect of the disclosure, there is provided a method of measuring fluid flow within a conduit. The method comprises attaching an apparatus to a conduit for conveying a fluid, the apparatus comprising: a mount; a flow sensing device attached to the mount and configured to move relative to the mount in response to flow of the fluid within the conduit, wherein the flow sensing device is attached to the mount via a coupling; and a sensor configured to measure movement of the flow sensing device. The apparatus is attached to the conduit so as to define a high-pressure zone in an interior of the conduit and a low-pressure zone in an exterior of the conduit, and the coupling is located within the high-pressure zone. The method further comprises flowing the fluid through the conduit; and using the sensor to measure movement of the flow sensing device relative to the mount, in response to the flow of the fluid.

The apparatus may further comprise one or more static seals for preventing fluid communication between the high-pressure zone and the low-pressure zone.

The flow sensing device may comprise a paddle and a straight arm extending from the paddle to the coupling.

The coupling may comprise a shaft attached to the flow sensing device and configured to rotate relative the mount. A straight line may connect an end of the paddle, the straight arm and the coupling.

The mount may comprise a bearing arrangement for facilitating rotation of the shaft relative to the mount. The bearing arrangement may comprise an incompressible fluid, such as incompressible grease. The incompressible fluid may be in contact with the shaft for facilitating rotation of the shaft relative to the mount. The bearing arrangement may further comprise a pressure-balanced seal, such as a wiper, for preventing contact between the incompressible fluid and a fluid flowing through the conduit.

Attaching the apparatus to the mount may further comprise locating the shaft and the one or more bearings within the high-pressure zone.

The sensor may be sealed in an enclosure with one or more further static seals adjacent one or more apertures formed in the enclosure. The sensor may comprise a Hall effect sensor array located within the enclosure and configured to detect a change in a magnetic field generated by a magnetic component fixed to the coupling.

In a further aspect of the disclosure, there is provided a drilling rig comprising: a tank comprising drilling fluid; one or more conduits allowing flow of drilling fluid to and from the tank; and one or more of any of the above-described flow sensing devices, or one or more of any of the above-described apparatuses, positioned for measuring flow of the drilling fluid along the one or more conduits.

BRIEF DESCRIPTION OF THE DRAWINGS

Specific embodiments of the disclosure will now be described in conjunction with the accompanying drawings of which.

DESCRIPTION OF SPECIFIC EMBODIMENTS

The present disclosure seeks to provide improved systems, devices and methods for measuring fluid flow within a conduit. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

Figure 1:
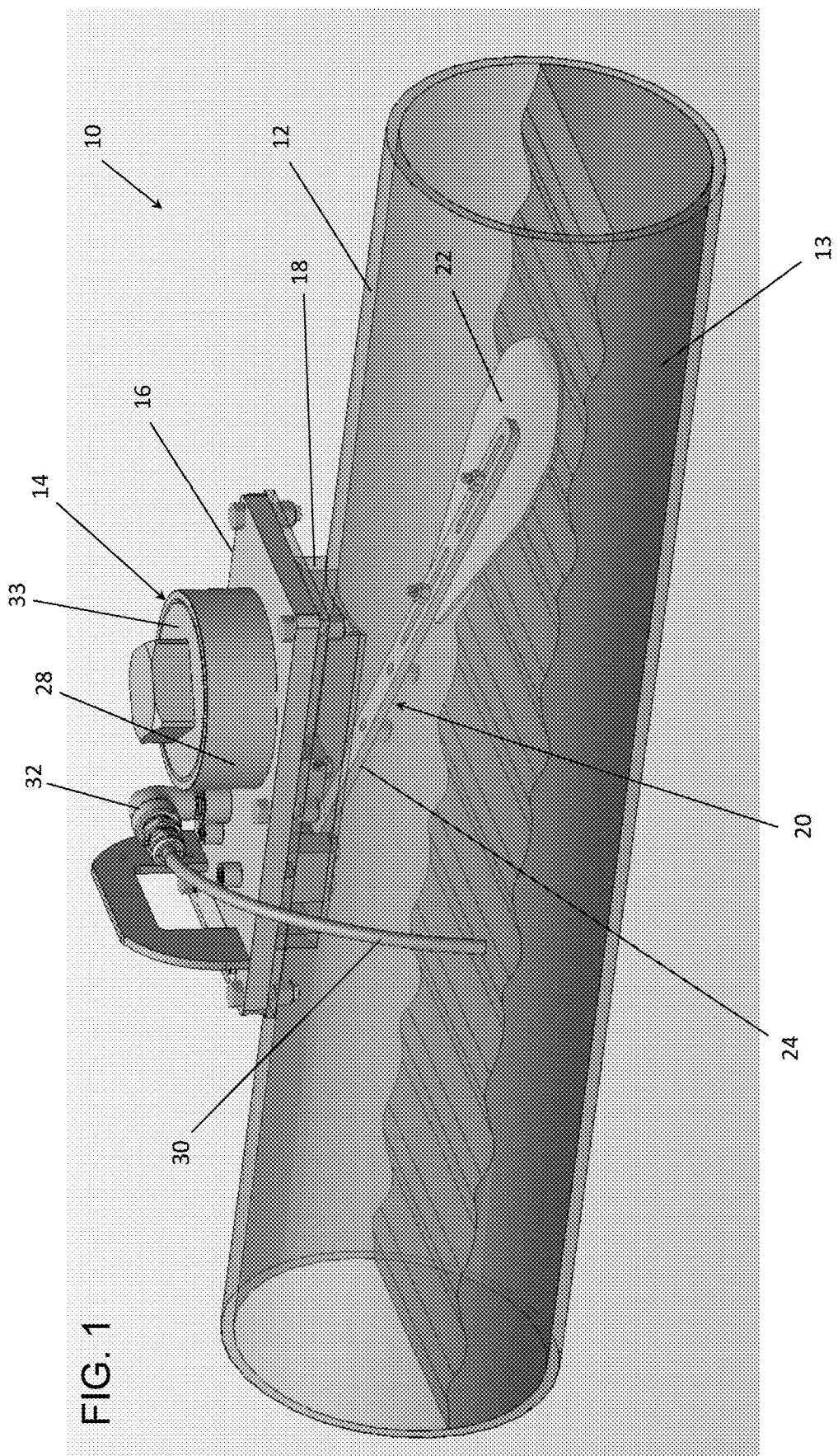
FIG. 1 is a perspective view of a system for measuring fluid flow within a conduit, in accordance with an embodiment of the disclosure.

Turning to FIG. 1, there is shown an embodiment of a system 10 for measuring fluid flow in a conduit. System 10 shows a conduit 12 for conveying a fluid, which in the embodiment of FIG. 1 is drilling mud 13. For example, conduit 12 may be an outflow line connected to a blowout preventer (BOP) at a drilling site. System 10 includes a mount 14 attached to conduit 12. Mount 14 comprises generally a mount lid 16 fixed (e.g. via one or more bolts) to a mount lower portion 18 which comprises a flange. Mount lower portion 18 is attached to conduit 12 by being positioned to engage and seal with an opening formed within a wall of conduit 12. In particular, mount lower portion 18 is welded to conduit 12. An elastomeric gasket is provided at the interface of mount lid 16 and mount lower portion 18.

A flow sensing device, or flow paddle 20, is rotatably coupled to mount 14, as will be described in more detail below. Flow paddle 20 comprises a paddle 22 at a first end of flow paddle 20. Flow paddle 20 further comprises a straight arm 24 attached to paddle 22 and extending linearly from paddle 22 to a rotary coupling between mount 14 and flow paddle 20. The opposite, second end of straight arm 24 is fixed to the rotary coupling. The end of paddle 22 is aligned with straight arm 24 and the coupling such that a straight line connects the end of paddle 22, straight arm 24 and the pivot point between flow paddle 20 and mount 14.

In some embodiments, weights (not shown) may be positioned on an upper surface of straight arm 24 so as to bias straight arm 24 downwardly towards the flow of drilling mud 13. In such embodiments, a cavity 28 and cap 33 may be provided on mount lid 16 for housing weights 26 during rotation of flow paddle 20. A sensor cable 30 is connected to mount 14 via a cable coupling 32. As described in further detail below, sensor cable 30 is used to transmit readings taken by a flow sensor. It is preferable that during operation fluid does not flow through conduit 12 in a vacuum. In other words, it is preferable that conduit 12 comprise both a flowing liquid and a headspace of air. Under vacuum conditions, cap 33 may be replaced with a vacuum check valve in order to introduce air into conduit 12 and remove the vacuum.

Figure 2:
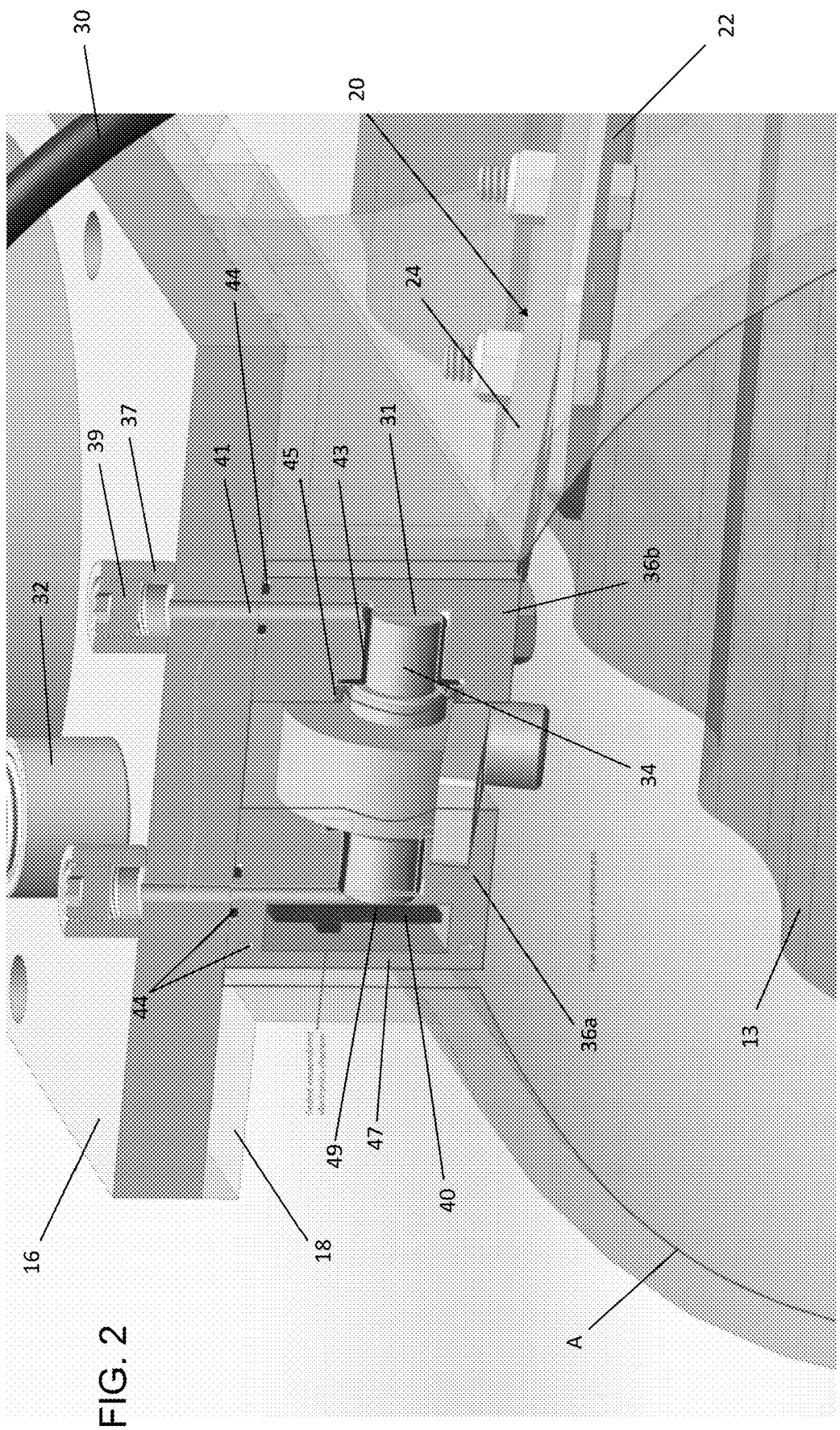
FIG. 2 is a cross-sectional view of the system of FIG. 1.

Turning now to FIG. 2, there is shown a cross-sectional view of system 10, showing the rotary coupling between flow paddle 20 and mount 14 in more detail. In particular, straight arm 24 is engaged to a shaft 34 configured to rotate within a bearing arrangement comprising bearings blocks 36a and 36b forming part of mount lower portion 18. The bearing arrangement additionally comprises an incompressible backing fluid in the form of grease (not shown) for facilitating rotation of shaft 34 relative to bearing blocks 36a and 36b. The grease is introduced to the bearing arrangement via grease fill ports 37 which are then sealed by plugs 39 for providing pressure isolation between the grease pressure and atmospheric pressure. Grease supply tubes 41 allow grease introduced via grease fill ports 37 to fill respective volumes 31 between bearing blocks 36a and 36b, and shaft 34. A polymer bearing 43, in combination with the grease, allows for relatively low-friction rotation of shaft 34 relative to bearing blocks 36a,b. The bearing arrangement further comprises pressure-balanced seals in the form of rotational wipers 45 for limiting or preventing contact between the grease and drilling mud 13.

A sealed sensor enclosure 47 is provided adjacent the rotary coupling. Enclosure 47 houses circuitry 40 and a magnetic sensor comprising a Hall effect sensor array 49. As known to those of skill in the art, Hall effect sensor array 49 is configured to generate a reading indicative of the relative rotation of a magnetic field generated by diametrically magnetized magnet (not shown) fixed to an end of shaft 34 adjacent volume 31 nearest circuitry 40. Circuitry 40 is communicatively coupled to sensor cable 30 and is configured to transmit readings obtained by Hall effect sensor array 49 along sensor cable 30.

As can be seen in FIG. 2, the sealing of mount lid 16 to mount lower portion 18 defines an area of relatively high pressure and an area of relatively low pressure. This high-pressure zone is referred to as such since the interior of conduit 12 may be exposed to relatively high pressure during a drilling operation. The relatively low-pressure zone is an area of "normal" pressure (e.g. atmospheric pressure) as it is external to mount 14 and conduit 12. The boundary between the high-pressure zone and the low-pressure zone is defined by line A. The rotary coupling, and in particular the portion of shaft 34 extending from one set of wipers 45 to the other set of wipers 45, is located within the high-pressure zone.

Figure 3:
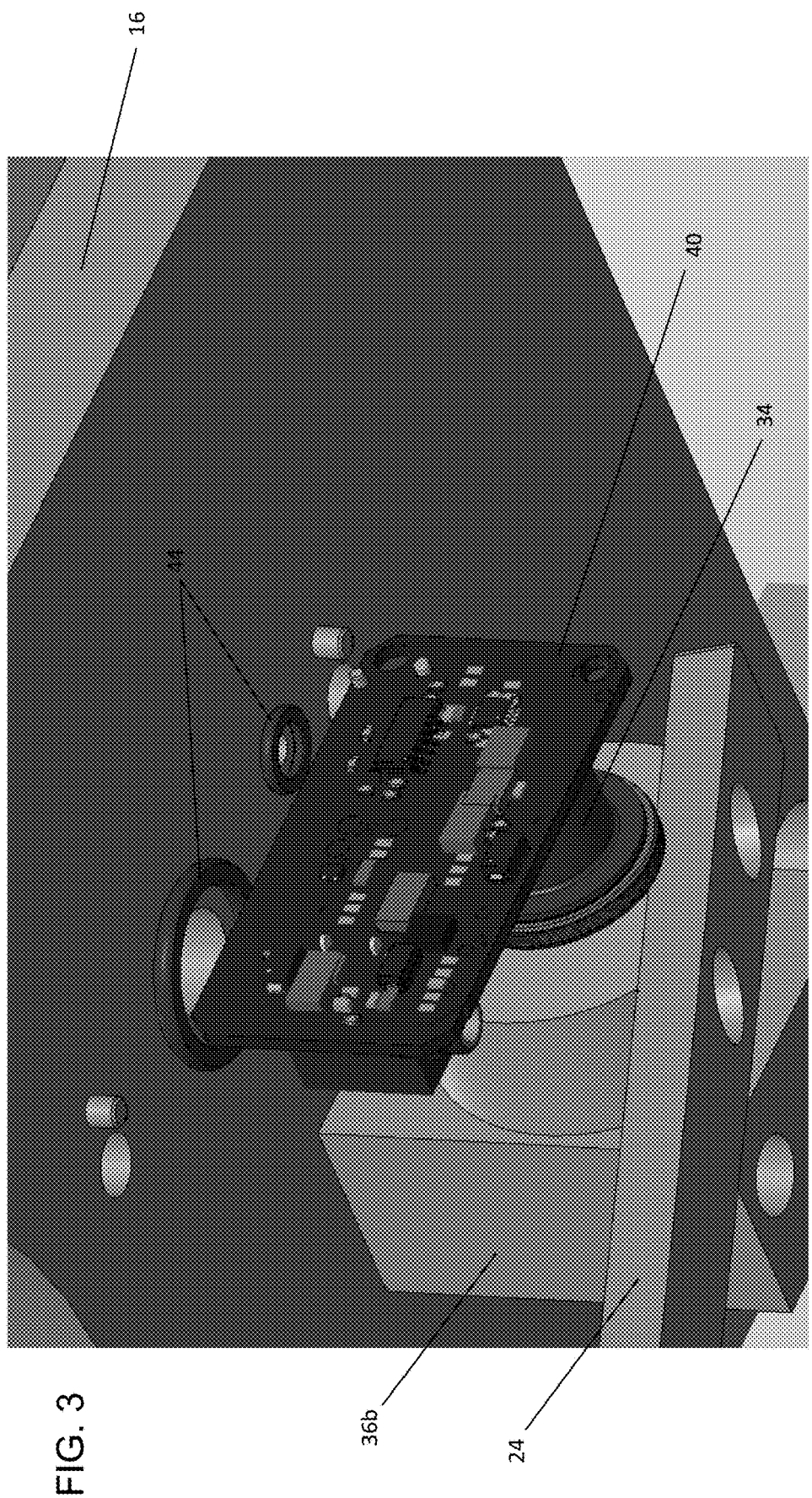
FIG. 3 is a perspective view of the system of FIG. 1, with some components removed for clarity.

In order to prevent fluid communication between the high-pressure zone and the low-pressure zone, and to maintain the pressure differential therebetween, static seals 44 are provided around one or more apertures formed within mount 14. FIG. 3 shows the underside of mount lid 16 with various components absent for clarity. As can be seen in FIG. 3, static seals 44 in the form of O-rings (two of which can also be seen in FIG. 2) circumscribe openings formed in mount lid 16. The openings are provided in order to allow for wired communication between circuitry 40 and sensor cable 30, and in order to allow for injection of grease via grease supply tubes 41. Static seals 44 are thus located at the boundary between the high-pressure zone and the low-pressure zone.

In other embodiments, conduit 12 may not be pressurized, in which case there is substantially no pressure differential between the interior of conduit 12 and the exterior of conduit 12. Nonetheless, in such embodiments it may be advantageous to keep circuitry 40 and Hall effect sensor array 49 sealed within enclosure 47 so as to shield them from explosive gases flowing through conduit 12. Enclosure 47 and static seals 44 further seal circuitry 40 and Hall effect sensor array 49 from mud 13 flowing through conduit 12.

In use, without flow of drilling mud 13 through conduit 12, flow paddle 20 is biased towards the bottommost portion of conduit 12 until paddle 22 contacts the interior of conduit 12. In some embodiments, weights may be used to assist in biasing flow paddle 20 towards the bottom of conduit 12. When drilling mud 13 flows through conduit 12, drilling mud 13 impinges paddle 22 and causes flow paddle 20 to pivot by rotating about the axis of rotation defined by shaft 34. Rotation of shaft 34 causes corresponding rotation of the magnet relative to Hall effect sensor array 49 provided with circuitry 40. As known to those of skill in the art, Hall effect sensor array 49 detects the relative rotation of the magnet and outputs a reading indicative of the relative rotation, via sensor cable 30. The readings are transmitted via sensor cable 30 to an electronic drilling recorder which may apply a calibration to the reading in order to determine the flow rate of drilling mud 13 within conduit 12.

While in the present embodiment the particular sensor is described as a magnetic sensor using a Hall effect device, it will be appreciated by those of skill in the art that other types of sensors (for example an inductive sensor) may be used provided that they may detect rotation of shaft 34 relative to mount 14. Furthermore, it is envisaged that the sensor may communicate its readings in a wireless manner, without the need for sensor cable 30. In such a case, there would be no need for a static seal 44 between enclosure 47 and mount lid 16.

Figure 4:
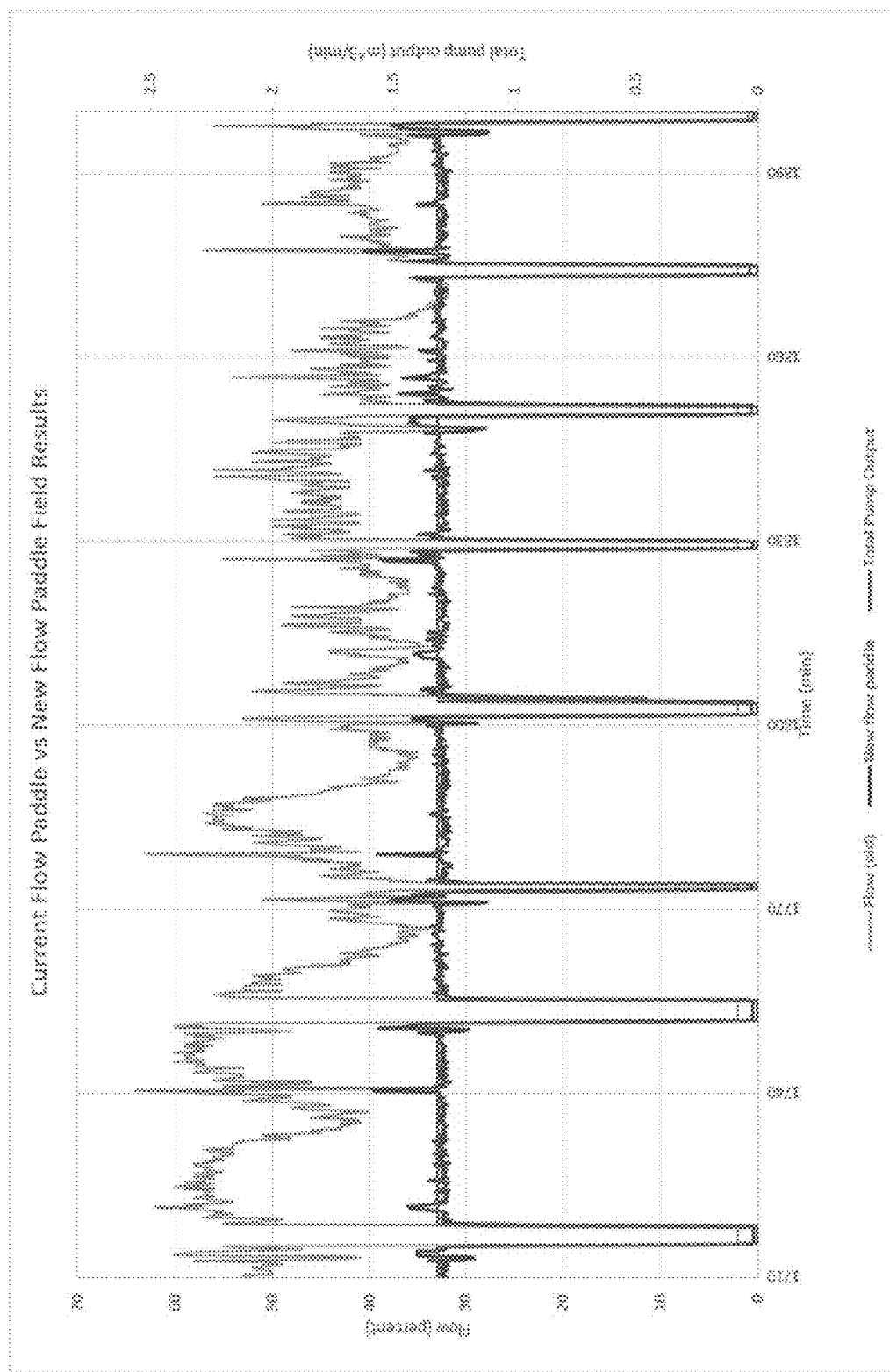
FIG. 4 is a plot of data obtained from a field test of a flow paddle according to an embodiment of the disclosure, and a flow paddle according to the prior art.
Figure 4:
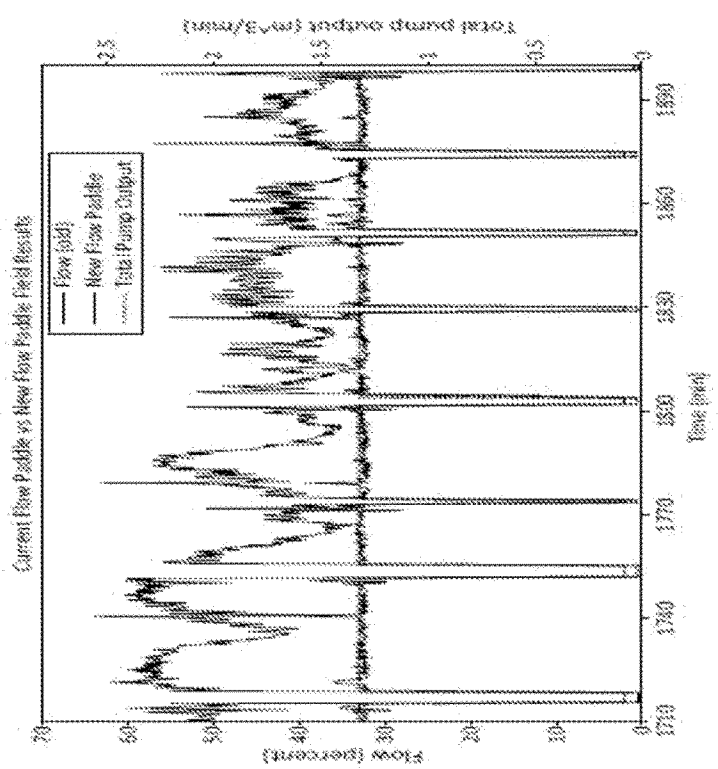

It has been found that the flow paddle described herein is generally more accurate than conventional flow paddles. For example, FIG. 4 shows data obtained from a field test in which two flow paddles (one according to the prior art and one according to the above-described embodiment) were mounted onto a single flow line. The relative flow value should to a large degree track the green line (corresponding to input flow measured at the pumps). As can be seen, the blue line tracks the green line more closely than the orange line. Additional spikes in the flow measurement are the result of hole volume changes created by rapid movement of the drill string displacing fluid.

While the disclosure has been described in connection with specific embodiments, it is to be understood that the disclosure is not limited to these embodiments, and that alterations, modifications, and variations of these embodiments may be carried out by the skilled person without departing from the scope of the disclosure. For example, while the present disclosure has provided a description of an embodiment in which a flow paddle pivots relative to the mount, it is envisaged that other forms of motion may be encompassed by the disclosure. For example, instead of rotary motion, the system could be configured such that the flow paddle moved linearly relative to the mount, using for example the deflection of a leaf spring as a means of quantifying the flow rate of the drilling fluid. It is furthermore contemplated that any part of any aspect or embodiment discussed in this specification can be implemented or combined with any part of any other aspect or embodiment discussed in this specification.

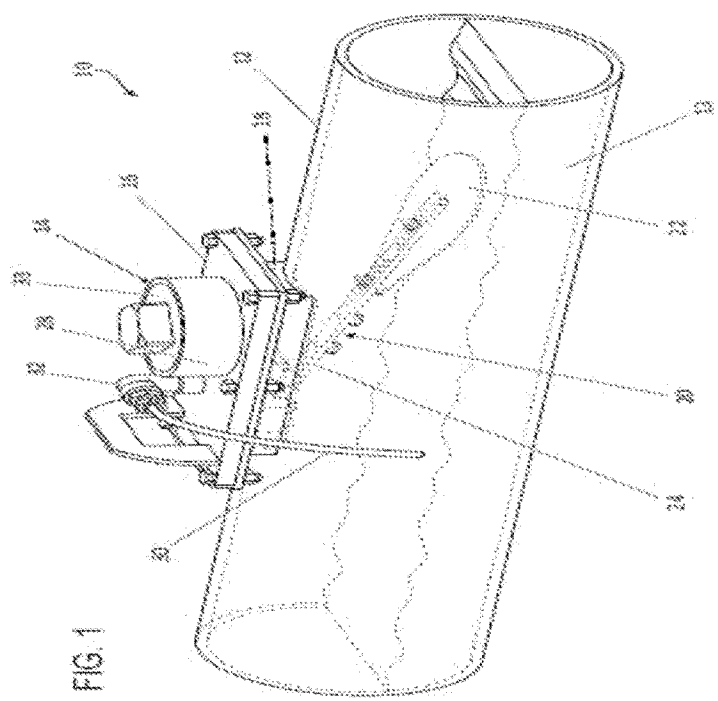

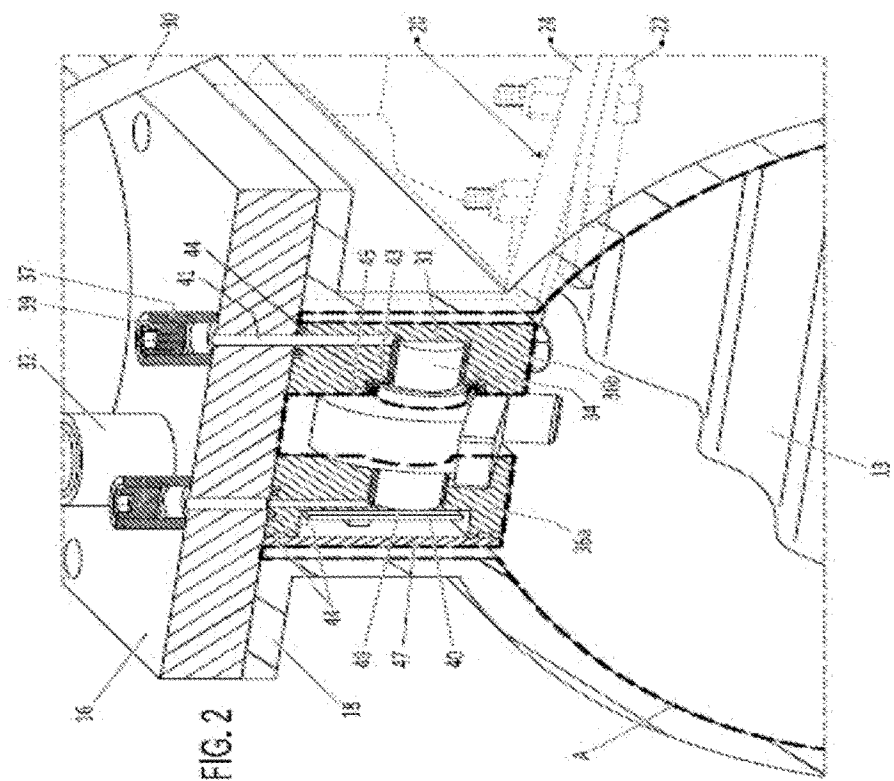

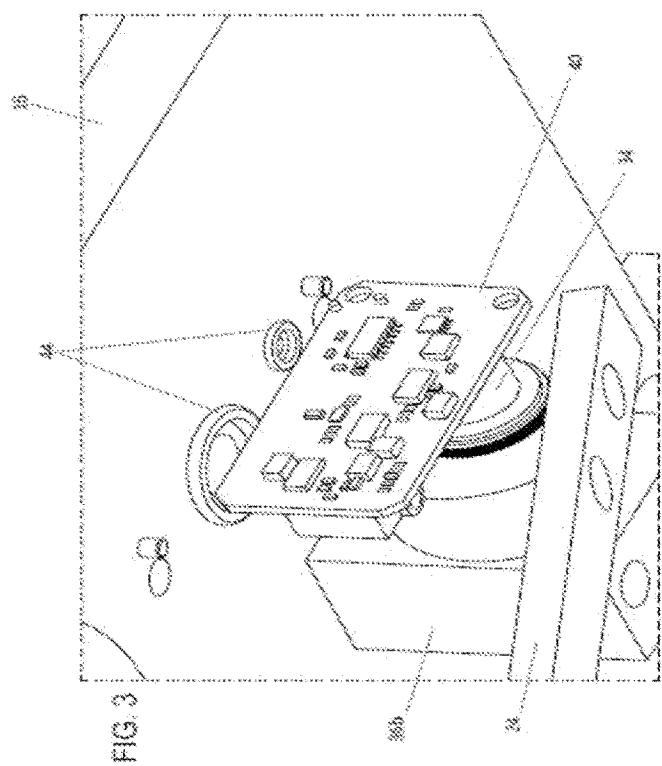

The invention claimed is:

1. A system for measuring fluid flow within a conduit, comprising:
   the conduit for conveying a fluid;
   a mount attached to a top of the conduit and defining when the system is in use a high-pressure zone in an interior of the conduit and a low-pressure zone in an exterior of the conduit, wherein a pressure in the high-pressure zone is greater than a pressure in the low-pressure zone;
   a flow sensing device attached to the mount and configured to move relative to the mount in response to flow of the fluid within the conduit and along a bottom of the conduit, wherein the flow sensing device is attached to the mount via a coupling located within the high-pressure zone, and wherein the flow sensing device is configured to move toward the top of the conduit in response to the flow of the fluid along the bottom of the conduit; and
   a sensor configured to measure movement of the flow sensing device.

2. The system of claim 1, further comprising one or more static seals for preventing fluid communication between the high-pressure zone and the low-pressure zone.

3. The system of claim 1, wherein the flow sensing device comprises a paddle and a straight arm extending from the paddle to the coupling.

4. The system of claim 1, wherein the coupling comprises a shaft attached to the flow sensing device and configured to rotate relative the mount, and wherein at least a portion of the shaft is located within the high-pressure zone.

5. The system of claim 4, wherein the mount comprises a bearing arrangement for facilitating rotation of the shaft relative to the mount, and wherein the bearing arrangement comprises an incompressible fluid.

6. The system of claim 1, wherein the sensor is sealed from the high-pressure zone in an enclosure and by using one or more static seals.

7. The system of claim 3, wherein a straight line connects an end of the paddle, the straight arm, and the coupling, wherein the coupling comprises a shaft, and wherein an axis of rotation defined by the shaft is orthogonal to the straight line.

8. A flow sensing device for measuring fluid flow within a conduit, comprising:
   a paddle;
   a mount configured to be attached to a conduit for conveying a fluid;
   a straight arm attached to the mount and extending from the paddle to the mount, wherein the straight arm is configured to move relative to the mount in response to flow of the fluid within the conduit; and
   a sensor configured to measure movement of the flow sensing device,
   wherein the straight arm is attached to the mount via a coupling comprising a shaft attached to the straight arm and configured to rotate relative the mount.

9. The flow sensing device of claim 8, further comprising one or more static seals adjacent one or more apertures formed in the mount.

10. The flow sensing device of claim 8, wherein the mount comprises a bearing arrangement for facilitating rotation of the shaft relative to the mount, and wherein the bearing arrangement comprises an incompressible fluid.

11. The flow sensing device of claim 10, wherein the bearing arrangement further comprises a pressure-balanced seal for preventing contact between the incompressible fluid and a fluid flowing through the conduit.

12. The flow sensing device of claim 8, wherein the sensor is sealed in an enclosure with one or more static seals adjacent one or more apertures formed in the enclosure.

13. The system of claim 8, wherein a straight line connects an end of the paddle, the straight arm, and the coupling.

14. The flow sensing device of claim 13, wherein an axis of rotation defined by the shaft is orthogonal to the straight line.

15. An apparatus for measuring fluid flow within a conduit, comprising:
a mount configured to be attached to a conduit for conveying a fluid;
a flow sensing device attached to the mount and configured to move relative to the mount in response to flow of the fluid within the conduit;
one or more static seals adjacent one or more apertures formed in the mount, for preventing fluid communication from a first side of the mount to a second side of the mount via the one or more apertures, wherein, when the apparatus is in use, the one or more static seals are in contact with surfaces of the apparatus that are stationary relative to the one or more static seals; and
a sensor configured to measure movement of the flow sensing device.

16. The apparatus of claim 15, wherein the flow sensing device comprises a paddle and a straight arm extending from the paddle to the mount.

17. The apparatus of claim 15, wherein the straight arm is attached to the mount via a coupling comprising a shaft attached to the straight arm and configured to rotate relative the mount, and wherein a straight line connects an end of the flow sensing device, the straight arm, and the coupling.

18. The apparatus of claim 15, wherein the mount comprises a bearing arrangement for facilitating rotation of the shaft relative to the mount, and wherein the bearing arrangement comprises an incompressible fluid.

19. The apparatus of claim 18, wherein the bearing arrangement further comprises a pressure-balanced seal for preventing contact between the incompressible fluid and a fluid flowing through the conduit.

20. The apparatus of claim 15, wherein the sensor is sealed in an enclosure with one or more further static seals adjacent one or more apertures formed in the enclosure.

21. The flow sensing device of claim 17, wherein an axis of rotation defined by the shaft is orthogonal to the straight line.

22. A method of measuring fluid flow within a conduit, comprising:
attaching an apparatus to the conduit for conveying a fluid, the apparatus comprising:
a mount for attaching to a top of the conduit;
a flow sensing device attached to the mount and configured to move relative to the mount and toward the top of the conduit in response to flow of the fluid within the conduit and along a bottom of the conduit, wherein the flow sensing device is attached to the mount via a coupling; and
a sensor configured to measure movement of the flow sensing device,
wherein the apparatus is attached to the conduit so as to define, when the fluid is flowing within the conduit, a high-pressure zone in an interior of the conduit and a low-pressure zone in an exterior of the conduit, wherein a pressure in the high-pressure zone is greater than a pressure in the low-pressure zone, and wherein the coupling is located within the high-pressure zone;
flowing the fluid through the conduit; and
using the sensor to measure movement of the flow sensing device relative to the mount, in response to the flow of the fluid.

23. The method of claim 22, wherein the flow sensing device comprises a paddle and a straight arm extending from the paddle to the coupling.

24. The method of claim 23, wherein a straight line connects an end of the paddle, the straight arm, and the coupling, wherein the coupling comprises a shaft, and wherein an axis of rotation defined by the shaft is orthogonal to the straight line.

* * * * *

UNITED STATES PATENT AND TRADEMARK OFFICE
CERTIFICATE OF CORRECTION

PATENT NO. : 10,871,388 B2
APPLICATION NO. : 15/917433
DATED : December 22, 2020
INVENTOR(S) : Marceau van Beurden It is certified that error appears in the above-identified patent and that said Letters Patent is hereby corrected as shown below:

In the Drawings

Sheet 1, Fig. 1, replace with the attached figure

Sheet 2, Fig. 2, replace with the attached figure

Sheet 3, Fig. 3, replace with the attached figure

Sheet 4, Fig. 4, replace with the attached figure

Signed and Sealed this
Eighth Day of June, 2021

Drew Hirshfeld
*Performing the Functions and Duties of the
Under Secretary of Commerce for Intellectual Property and
Director of the United States Patent and Trademark Office*